US007837923B2

(12) United States Patent
Bearse et al.

(10) Patent No.: US 7,837,923 B2
(45) Date of Patent: *Nov. 23, 2010

(54) METHOD OF MOLDING LOAD-BEARING ARTICLES FROM COMPRESSIBLE CORES AND HEAT MALLEABLE COVERINGS

(75) Inventors: Ed Bearse, Lake, MI (US); Thomas Bohan, Westlake, OH (US); David Hedley, Ameliasburg (CA); Alan Lewis, Indianapolis, IN (US)

(73) Assignee: Novo Foam Products LLC, Westlake, OH (US)

( * ) Notice: Subject to any disclaimer, the term of this patent is extended or adjusted under 35 U.S.C. 154(b) by 9 days.

This patent is subject to a terminal disclaimer.

(21) Appl. No.: 12/173,973

(22) Filed: Jul. 16, 2008

(65) Prior Publication Data
US 2008/0272511 A1  Nov. 6, 2008

Related U.S. Application Data

(63) Continuation of application No. 10/858,184, filed on Jun. 1, 2004, now Pat. No. 7,413,698.

(51) Int. Cl.
*B29C 67/20* (2006.01)
*B29C 45/14* (2006.01)
*B29B 13/00* (2006.01)

(52) U.S. Cl. .............. 264/321; 264/255; 264/259; 264/266; 264/271.1; 264/279.1; 264/320; 264/511; 264/544; 264/553

(58) Field of Classification Search .......... None
See application file for complete search history.

(56) References Cited

U.S. PATENT DOCUMENTS 3,709,161 A    1/1973  Kauffman
3,879,245 A *  4/1975  Fetherston et al. .......... 156/245
3,915,098 A   10/1975  Nania
4,039,643 A    8/1977  Dean et al.
4,279,204 A    7/1981  Propst
4,692,199 A *  9/1987  Kozlowski et al. .......... 156/245
4,902,557 A    2/1990  Rohrbacher
4,923,539 A *  5/1990  Spengler et al. ............... 156/79
4,993,740 A *  2/1991  Recher et al. ............... 280/610
5,046,434 A    9/1991  Breezer et al.
5,117,762 A    6/1992  Shuert
5,133,276 A    7/1992  Alesi et al.

(Continued)

FOREIGN PATENT DOCUMENTS

EP          0531473 B1    3/1992

(Continued)

OTHER PUBLICATIONS

European Search Report for corresponding European Application No. 05735496.1, dated Nov. 9, 2009.

*Primary Examiner*—Jeffrey Wollschlager
(74) *Attorney, Agent, or Firm*—Renner, Otto, Boisselle & Sklar, LLP

(57) ABSTRACT

Load-bearing articles are manufactured from shape defining compressible cores and thermoplastic shells. The manufacture of these articles requires specific methods and tools. Articles that can be manufactured using these methods include relatively lightweight pallets with high load-bearing capacity.

25 Claims, 7 Drawing Sheets

U.S. PATENT DOCUMENTS

| | | | |
|---|---|---|---|
| 5,205,221 A | | 4/1993 | Melin et al. |
| 5,219,513 A | * | 6/1993 | Addeo et al. ................ 264/510 |
| 5,288,097 A | * | 2/1994 | Pascal et al. ................ 280/610 |
| 5,308,557 A | * | 5/1994 | Addeo et al. ................. 264/28 |
| 5,351,628 A | | 10/1994 | Breezer et al. |
| 5,401,347 A | | 3/1995 | Shuert |
| 5,401,456 A | | 3/1995 | Alesi et al. |
| 5,404,829 A | | 4/1995 | Shuert |
| 5,413,052 A | | 5/1995 | Breezer et al. |
| 5,427,732 A | | 6/1995 | Shuert |
| 5,449,425 A | * | 9/1995 | Renard et al. ................ 156/78 |
| 5,476,618 A | * | 12/1995 | Ito et al. ................... 264/45.4 |
| 5,624,517 A | | 4/1997 | Giesen et al. |
| 5,624,630 A | | 4/1997 | Breezer et al. |
| 5,626,814 A | * | 5/1997 | Vicino ........................ 264/511 |
| 5,635,129 A | | 6/1997 | Breezer et al. |
| 5,641,524 A | | 6/1997 | Rush et al. |
| 5,651,463 A | | 7/1997 | Major et al. |
| 5,676,064 A | | 10/1997 | Shuert |
| 5,833,796 A | | 11/1998 | Matich |
| 5,885,691 A | | 3/1999 | Breezer et al. |
| 5,891,293 A | * | 4/1999 | Kelly et al. ................. 156/285 |
| 5,950,546 A | | 9/1999 | Brown et al. |
| 6,076,582 A | | 6/2000 | Thary |
| 6,216,608 B1 | | 4/2001 | Woods et al. |
| 6,224,706 B1 | | 5/2001 | Matich |
| 6,277,773 B1 | | 8/2001 | Ward et al. |
| 6,294,114 B1 | | 9/2001 | Muirhead |
| 6,340,194 B1 | | 1/2002 | Muirhead et al. |
| 6,372,176 B1 | | 4/2002 | Ekendahl et al. |
| 6,379,606 B1 | | 4/2002 | Chun et al. |
| 6,403,195 B1 | | 6/2002 | Montagna et al. |
| 6,661,339 B2 | | 12/2003 | Muirhead |
| 6,718,888 B2 | | 4/2004 | Muirhead |
| 6,749,418 B2 | | 6/2004 | Muirhead |
| 6,749,419 B2 | | 6/2004 | Nightingale et al. |
| 6,749,782 B2 | * | 6/2004 | Chen ........................ 264/46.5 |
| 6,786,992 B2 | | 9/2004 | Dummett |
| 6,884,823 B1 | | 4/2005 | Pierick et al. |
| 6,943,678 B2 | | 9/2005 | Muirhead |
| 7,063,881 B1 | | 6/2006 | Matich |
| 7,128,797 B2 | | 10/2006 | Dummett |
| 2002/0112653 A1 | | 8/2002 | Moore, Jr. et al. |
| 2002/0149138 A1 | | 10/2002 | Campbell et al. |
| 2003/0198775 A1 | | 10/2003 | Roth et al. |
| 2004/0168618 A1 | | 9/2004 | Muirhead |
| 2005/0237184 A1 | | 10/2005 | Muirhead |
| 2005/0241548 A1 | | 11/2005 | Muirhead |
| 2006/0243175 A1 | | 11/2006 | Dummett |
| 2006/0254699 A1 | | 11/2006 | Dummett |

FOREIGN PATENT DOCUMENTS

| | | |
|---|---|---|
| EP | 0 520 508 | 12/1992 |
| EP | 0 586 908 | 3/1994 |
| EP | 1083039 A1 | 9/2001 |

* cited by examiner

METHOD OF MOLDING LOAD-BEARING ARTICLES FROM COMPRESSIBLE CORES AND HEAT MALLEABLE COVERINGS

CROSS-REFERENCE TO RELATED APPLICATIONS

This application is a continuation application of application Ser. No. 10/858,184, filed, Jun. 1, 2004, the entire disclosure of which is hereby incorporated herein by reference.

TECHNICAL FIELD

The invention relates generally to methods of forming load-bearing articles, such as pallets, by compressing and encasing shape defining compressible cores within a chemically compatible compression resistant thermoplastic covering.

BACKGROUND

Thermoplastic molding is used to create a wide variety of useful articles. In general, the process of thermoplastic molding involves heating a thermoplastic material to its glass transition temperature, at which point the material becomes pliable. Other steps in the process include shaping the pliable thermoplastic into the shape of a desired article and allowing the article to cool. Once a thermoplastic material cools to a temperature beneath the range of its glass transition temperature the material becomes significantly less pliable and maintains its new shape. A number of processes have been developed for shaping thermoplastics including single and twin sheet thermoforming.

The twin sheet thermoplastic molding process is often used to create articles that have a hollow region formed between thermoplastic sheets joined to one another at their edges. Examples of articles that have a hollow space between joined thermoplastic sheets include serving pans and thermos bottles. See, for example, U.S. Pat. No. 5,427,732 to Shuert, which is herein incorporated by reference in its entirety. While such articles are clearly useful, most hollow articles are not suitable for use in load-bearing applications.

Thermoplastics are used to laminate various articles including some load-bearing structures. These methods often involve applying thermoplastic sheets to a preformed rigid structure. See, for example, U.S. Pat. No. 5,833,796 to Matich, which is herein incorporated by reference in its entirety. The structural component is essentially rigid and a thermoplastic skin is applied to either one or both sides of the structural component.

The manufacture of articles by twin sheet thermoplastic molding often involves the use of complimentary male and female molding tools. In one common methodology a thin sheet of thermoplastic material is heated until it is pliable, and positioned adjacent to a male mold. The thermoplastic sheet is then moved relative to the tool's surface until the sheet assumes the same shape as the surface of the tool.

Similarly, a second sheet of thermoplastic material is heated until it becomes pliable. The heated second sheet is then centered over the cavity of a female molding tool and moved relative to the female tool molding until the interior portion of the second sheet substantially conforms to the interior shape of the female tool.

One variation of this method, sometimes referred to as vacuum-assist molding, uses vacuum to help draw heated thermoplastic sheets into contact with the surface of the tools. Irrespective of how they are formed, after the two thermoplastic sheets have taken on the shapes of the male and female molds, the edges of the sheets are pressed together and welded to form a single article. For a further discussion of vacuum-assist thermoplastic molding, see, for example, U.S. Pat. No. 5,641,524 to Rush et al., which is hereby incorporated by reference in its entirety.

Vacuum-assist molding works well to manufacture articles that have convex or shallow concave features. The method does not work as well to manufacture articles that have deep narrow concave features. If the female mold cavity is too deep or the sides of the mold too steep, the attractive force supplied by vacuum alone may be insufficient to properly seat the sheet on the interior surface of the female mold.

One method developed to address this problem is referred to as plug-assist molding. Briefly, in plug-assist molding, a rigid tool is used to push a heated sheet at least partly into the cavity of a second tool with a surface shape complimentary to the shape of the first tool. It is easier to manufacture articles that have deep narrow features using plug-assist molding, than it is to manufacture these types of articles using vacuum-assist molding. For an additional discussion of plug-assist molding, see, for example, U.S. Pat. Nos. 6,379,606 to Chun et al., and 5,641,524 to Rush et al., both of which are hereby incorporated by reference in their entirety.

Plug-assist molding works well, but it too has some limitations. The use of the plug-assist molding method is problematic if the goal is to produce articles with load-bearing capabilities. Problems arise because plug-assist molding tends to produce articles that have an uneven distribution of thermoplastic material across the surface of the article. This occurs because the edges of the thermoplastic sheet are clamped in place while the plug contacts the interior of the sheet. As the plug advances material gathers on the leading face of the plug, stretching and thinning the portion of the sheet between the clamped edges and the leading face of the plug. As a result, articles formed by simple plug-assist may have relatively thick edges, bottoms and tops, and relatively thin sides.

An uneven distribution of material resulting in an article with thin sides is especially problematic if the article is used in a load-bearing capacity. The side sections join the top and bottom of the article, and in many load-bearing articles the sides support the top. In these applications the sides bear most of the load and since the sides are thinned in plug-assist molding, articles produced using this technique may be weaker than expected given the composition and thickness of the starting materials.

One way to correct problems caused by differential thinning is to begin the process by using thicker thermoplastic sheets. Another approach is to add additional thermoplastic material to specific portions of the article while it is being formed. See, for example, U.S. Pat. No. 5,885,691 to Breezer et al., which is hereby incorporated by reference in its entirety. Other methods for addressing this problem have also been advanced. See, for example, U.S. Pat. No. 5,427,732 to Shuert, which is hereby incorporated by reference in its entirety.

Given the limitations of currently used methods for making load-bearing articles from thermoplastics and the myriad of potential uses for load-bearing thermoplastics articles, there is a need for additional methods and machinery for the manufacture of such articles.

One area in need for strong, lightweight, load-bearing articles is the manufacture of pallets. Most pallets are designed for use with standard forklift trucks and crane lift cradles and are used throughout the world for the storage and transportation of goods. The majority of pallets in use worldwide are manufactured primarily from wood.

Wood is easy to work with, inexpensive, and well known in the warehousing and transportation industries. These properties account for the widespread use of wood in the manufacture of pallets. However, the use of wood in the manufacture of pallets does have some drawbacks. For example, wooden pallets absorb moisture, rot, splinter, and may harbor pests. The propensity of wooden pallets to harbor pests means that wooden pallets may inadvertently transport harmful fungi, bacteria, and insects between different eco-systems. The introduction of pests into a local eco-system via wooden packing materials, including wooden pallets, can have devastating effects on the local ecosystem.

Given the problems associated with wood-based pallets, there is a real need for pallets made from inexpensive, easy to manufacture, stable, and biologically inert materials, such as plastics. Examples of pallets made at least in part from plastics, can be found in U.S. Pat. Nos. 3,915,098 to Nania, and 6,216,608 to Woods et al. and in U.S. Patent Application Publication Number 2002/0112653 A1 to Moore, et al. All of the aforementioned references are herein incorporated by reference in their entirety. Despite the existence of these and other plastic-based pallets the continued widespread use of wooden pallets demonstrates the need for additional plastic based pallets.

Clearly, there is a need for load-bearing pallets constructed of stable, inexpensive, easily formed, and relatively inert materials, as well as methods and apparatus for manufacturing such pallets.

SUMMARY OF THE INVENTION

Some aspects of the present invention relate to load-bearing articles having compressible shape forming cores as well as apparatus and methods of manufacturing these articles. Various aspects of the invention are novel, nonobvious, and provide various advantages. While the actual nature of the invention covered herein can only be determined with reference to the claims appended hereto, certain forms and features, which are characteristic of the preferred embodiments disclosed herein, are described briefly as follows.

One embodiment is a method for forming load-bearing articles from compressible shape forming core members and compatible thermoplastic shells. The compressible core members are used as plugs in plug-assist molding processes to help shape the shell of a load-bearing article. The compressible core members used to shape the thermoplastic shell become part of the manufactured article and help to strengthen and stabilize the article. The compressible member, as a part of the manufactured article, continues to resist compression. The expansive force exerted by the core member trying to expand against the constraining force exerted by the shell strengthens the bond between the shell and the core throughout the useful life of the article.

Another embodiment is an apparatus for forming load-bearing articles comprised of compressible shape defining core members and thermoplastic shells. In one embodiment, a compressible core member is stacked or sandwiched between two heated thermoplastic sheets. The sandwich is compressed and corresponding portions of the two sheets contact one another and bond together. The core member bonds to the interior surface of the thermoplastic shell as the core member tries to expand and contacts portions of the thermoplastic shell.

Another embodiment is a load-bearing article including a shape defining compressible core member at least partially compressed with a thermoplastic shell. In one embodiment, the compressed core member is bonded to at least a portion of the interior of the thermoplastic shell.

The gross shape of most of the articles manufactured using the methods of these embodiments are largely determined by the gross shape of the shape defining compressible core member.

Further embodiments, objects, features, aspects, forms, advantages and benefits shall become apparent from the description and drawings contained herein.

DETAILED DESCRIPTION

Figure 1:
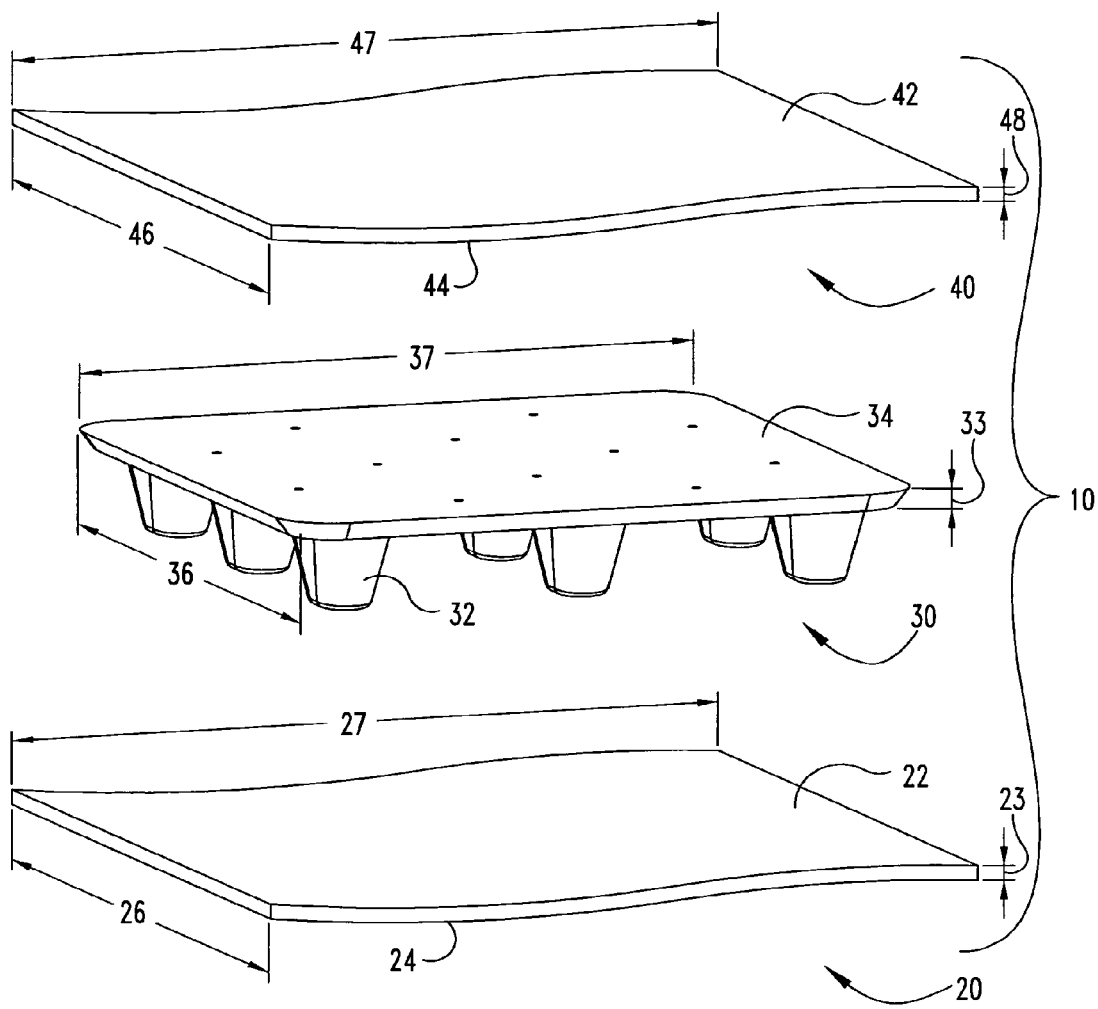
FIG. 1. An exploded perspective view of three components of a load-bearing article.

For the purposes of promoting an understanding of the principles of the invention, reference will now be made to the embodiments illustrated herein, and specific language will be used to describe the same. It will, nevertheless, be understood that no limitation of the scope of the invention is thereby intended. Any alterations and further modifications in the described processes, systems, or devices, and any further applications of the principles of the invention as described herein, are contemplated as would normally occur to one skilled in the art to which the invention relates.

The term "molding" as used in this application refers to the shaping of a pliable material to assume a new desired shape. Molding may involve the use of specific molding tools such as male and female molding tools, sculptured platens, and the like. It may also include the use of specifically shaped core members including compressible core members that are used to impart a desired shape to at least a portion of a thermoplastic material.

The term "convex" is to be given its broadest possible definition. The term convex, refers to a three dimensional object that has at least one feature protruding from the perspective of at least one other surface of the same or an adjacent article. For example, a rectangular shaped object with a given length, width, and height is considered convex as the profile formed by any 5 contiguous sides protruding from the plane defined by the sixth side of the rectangle.

The term "chemically compatible" refers to materials that can form bonds with one another. Chemically compatible materials include, for example, thermoplastics that have similar glass melting temperatures as well as thermoplastic materials that have glass melting temperature ranges, which overlap one another. For example, when chemically compatible materials in contact with one another are both at a temperature in their respective glass transition range and allowed to cool bonds form between the materials.

In one embodiment bonding between compatible materials occurs by polymerization. These chemically compatible materials are heated to their glass melting temperatures, held in contact with one another, and cooled together to polymerize and thereby form lasting bonds between the contacting portions of the materials. One method for the manufacture of load-bearing articles having both structural components and thermoplastic shells is similar to laminating the structural element with thermoplastic material. See, for example, U.S. Pat. No. 6,224,706 to Matich, herein incorporated by reference in its entirety. Vacuum is used to seat the thermoplastic component on the preformed rigid surface of the structural component. In order to admit vacuum to facilitate the lamination process the structural component must be porous. If the structural component is not composed of a porous material the component is made porous by introducing holes in the structural component to admit vacuum flow. Contact between the thermoplastic laminate is maintained by bonding between the structural component and the thermoplastic laminate. The structural component does not appreciably contract, compress, or change volume during the process of applying the laminate to the structural component. And, both the laminate and the structural component contract as the article cools.

One embodiment of the present invention is a method for the manufacture of various articles including load-bearing articles, which includes using a shape forming compressible core member to shape, stabilize, and strengthen a load-bearing article. The compressible core member is compressed during the molding process and continues to try and expand against the compressive contraction of the thermoplastic shell even after the article cools. In one embodiment the method includes using a combination of heat and pressure to create bonds between chemically compatible compressible core members and thermoplastic sheets.

One embodiment includes the steps of using a shape defining core member to substantially shape a thermoplastic sheet. The core member is at least partially enveloped by at least a portion of the sheet. The enveloped portion of the core member is at least partially compressed by the enveloping sheet and resists further compression. The portion of the thermoplastic sheet enveloping the corresponding portion of the core member resists expansion of the core material. The combination of expanding core member and expansion resistant envelope promotes and strengthens bonding between portions of the core member and thermoplastic sheet in contact with one another.

Still another embodiment is a molding method, which includes the steps of shaping a thermoplastic shell to partially conform to the shape of compressible core member. The volume of the core member, in its uncompressed form, is greater than the volume of the space formed by closure of the male and female molds. In this method the core is stacked (sandwiched) between two heated thermoplastic sheets positioned between male and female molds. As the molds are brought closer together the sandwich is compressed. Portions of the core and two sheets, as well as corresponding portions of the two sheets are brought into contact with one another.

Once compressed, the article is held under pressure until the article cools enough for bonds to form between portions of the sandwich in contact with one another. For example, bonds form between the edges of the two sheets in contact with one another. Similarly, core materials and thermoplastic sheet materials in contact with one another bond together as they cool.

One embodiment is a molding method that produces load-bearing articles, which are stronger and more durable than load-bearing articles formed from similar materials using different molding processes.

One embodiment is a matched tooling process wherein at least a portion of one of the molding tools is comprised of a shape defining compressible core member. The core member includes at least one feature, which is substantially complimentary to a feature in a matching molding tool. In one embodiment the compressible core member may include both male and female features, while the corresponding matching molding tool includes male and female features complimentary to the features in the compressible core member.

Still another embodiment includes the use of a concave female molding tool, a flat platen, and a convex shape defining compressible core member. While the overall shape of the convex portion of the core member is substantially complimentary to the concave shape of the female molding tool, the volume of the convex portion of the core member is larger than the volume of the interior of the female molding tool.

In one embodiment the compressible core member is used like a male tool in plug-assist molding process to drive a sheet of heated thermoplastic into the interior of the female molding tool. A stack, also referred to as a sandwich, is formed comprising the core member positioned between two heated thermoplastic sheets. The two thermoplastic sheets are sized and positioned such that regions of the two sheets, especially their edges, contact one another when the core is compressed between them.

In one embodiment the entire sandwich is compressed between a flat molding tool and the interior of the female molding tool. The core member and heated thermoplastic sheets are comprised of chemically compatible materials that bond to one another as heat is transferred between the heated sheets and core member. As the article cools, bonds form between sections of the article in contact with one another, including contacting sections of the thermoplastic sheets and compressed core member.

Still another embodiment is an apparatus for the manufacture of load-bearing articles from shape defining compressible core members and chemically compatible thermoplastic materials.

Yet another embodiment is a load-bearing article comprised of compressed shape defining core members and chemically compatible thermoplastic shells. A partial list of load-bearing articles that can be made in conformity with the methods of the present invention and the industries they may be utilized in are found in Table I.

TABLE I

Examples of load-bearing articles that can be manufactured with a shape defining compressible core member and a thermoplastic shell. Also, following is an abbreviated list of industries that can use such articles.

A/C Shells
Air Cargo Containers
Boards
Boat Parts
Bulkheads
Cargo boxes
Dunnage
Firewalls
Golf Cart Top/Body
Helmets
Infant car seats
Insulated Storage Lockers and Chests
Lawn Tractor Covers
Lumber alternatives
Medical equipment housings
Medical imaging tables
Pads
Pallets
Panels
Portable flooring
Race Seats
Roadside sound barriers
RV parts
Safety barriers
Spas/Tubs/Enclosure
Storage containers
Surgical tables
Tonneau covers
Tractor Top/Cab
Truck Cabs
Vehicle side panels
Vehicle bumpers These articles can be used in a wide variety of industries including, but not limited to, the following:

Aerospace
Appliance
Automotive
Construction
Defense
Furniture
Electronics
Food
High Technology
Medical
Packaging/Logistics
Pharmaceuticals
Sports Some of the thermoplastic materials that can be used in combination with chemically compatible core members to form articles according to some embodiments of the invention are listed in Table II.

TABLE II

List of some of the thermoplastic materials that can be used in combination with chemically compatible core members to form load-bearing articles.

Thermoplastic Olefin (TPO)
Polypropylene/Polypropylene composite
(sold under the trade name CURV)
Polycarbonate (PC)
High Impact Polystyrene (HIPS)
Low Density Polyethylene (LDPE)
High Density Polyethylene (HDPE)
Polypropylene (PP)
Polyphenylene Ether alloyed with High Impact Polystyrene
(sold under the trade name NORYL)

Thermoplastic sheet and shell materials including those listed in Table II may also include additives including, for example, plasticizers, dyes, pigments, hardeners, releasing agents, UV stabilizers, and the like as are known in the art.

One brand of TPO that may be used in this embodiment is SEQUEL E3000 available from SOLVAY. Table III includes a summary of the physical and chemical properties of SEQUEL E3000.

TABLE III

Summary of some of the physical and chemical properties of one brand of TPO, SEQUEL E3000 available from SOLVAY.

| PROPERTY | TYPICAL VALUE | UNITS | ASTM METHOD[1] |
|---|---|---|---|
| Hardness | 65 | Shore D | D-2240 |
| Specific Gravity | 1.07 | | D-792 |
| Melt Flow Rate (230° C., 2.16 kg load) | 1.3 | g/10 min | D-1238 Procedure A |
| Shrink | 0.007-0.009 | in/in | D-955 |
| Flexural Modulus | 300,000 (2,069) | psi (MPa) | D-790 I.B., TAN, 2 mm/min |
| Tensile Strength @ Yield | 3,100 (21) | psi (MPa) | D-638 |
| Elongation @ Break | 275 | % | D-638 |
| Gardner Impact | | | |
| @ 23° C. | >320 (36) | in-lb (J) | D-5420-96 |
| @ −30° C. | 310 (35) | in-lb (J) | D-5420-96 |
| Notched Izod Impact | | | |
| @ 23° C. | 18.5 NB | ft-lb/in | D-256 |
| @ −30° C. | 3.1 PB | ft-lb/in | D-256 |
| HDT @ 66 psi | 230 (110) | ° F. (° C.) | D-648 |
| @ 264 psi | 140 (60) | ° F. (° C.) | D-648 |
| CLTE (−30° C. to 80° C.) | $2.67 \times 10^{-5}$ ($4.81 \times 10^{-5}$) | in/in/° F. (mm/mm/° C.) | D-696 |
| UL94 Flammability | HB (all colors) | | Modified Underwriters Laboratory Inc. |

[1]Test performed in accordance with methods developed by ASTM International, 100 Barr Harbor Drive, PO Box C700, West Conshohocken, PA, 19428-2959 USA.

A partial list, of some materials that can be used to form shape-defining compressible core members for use in some embodiments of the invention are listed in Table IV.

TABLE IV

Some materials that can be used in combination with chemically compatible thermoplastics to form compressible core members.
Expanded Polypropylene (EPP)
Polystyrene (EPS)
A blend of polyphenylene ether (PPE) and polystyrene (PS) impregnated with pentane
(one such material is sold under the trade name GECET)
A blend of polyphenylene ether (PPE) and polystyrene (PS) impregnated with pentane
(one such material is sold under the trade name CARIL)
Polyethylene (EP)

The articles, apparatus, and methods of the invention can be adapted for use with a wide variety of materials, machinery, and processes widely used in thermoplastic molding. For example, rotary wheel twin-sheet thermoforming can be adapted for the practice of some of the embodiments of the invention. See, for example, U.S. patent to Chun et al., herein incorporated by reference in its entirety. Other methods and machinery known in the art can also be used to practice some of the embodiments of the invention.

A number of figures and illustrations are provided by way of explanation, not limitation. Throughout these figures and illustrations, like numbers are used whenever possible to refer to like components, elements, steps, and the like.

Referring now to FIG. 1, three elements 10 of a load-bearing article are illustrated, a first thermoplastic sheet 20, a shape defining core member 30, and a second thermoplastic sheet 40. In one embodiment these elements are combined to form a load-bearing article, as illustrated, for example, in FIG. 11. First thermoplastic sheet 20 and second thermoplastic sheet 40 are heated until they are pliable. The exact temperature range will depend upon the specific thermoplastic materials included in sheets 20 and 40.

Referring again to FIG. 1, first thermoplastic sheet 20 has a first surface 22 and a second surface 24. First thermoplastic sheet 20 may be comprised of any of a variety of thermoplastic materials that have physical and chemical properties suitable for the method and article of manufacture.

Still referring to FIG. 1, components for the manufacture of a load-bearing article in accordance with one embodiment include a shape defining compressible core member 30. Core member 30 has a first surface 32 and a second surface 34. In one embodiment second surface 34 of core member 30 is substantially flat, while first surface 32 of core member 30 has a convex interior and arcuate tapered edges 33.

In still another embodiment, first surface 32 of core member 30 includes both male (convex) 32 and female (concave not shown) features as assessed from the perspective of second surface 34.

In one embodiment first sheet 20 is comprised of TPO having a thickness 28 ranging from about 0.04 inches to about 0.08 inches. In another embodiment first sheet 20 is comprised of TPO having a thickness 28 of about 0.04 inches.

In one embodiment second sheet 40 is comprised of TPO having a thickness 48 ranging from about 0.04 inches to about 0.08 inches. In another embodiment second sheet 40 is comprised of TPO having a thickness 48 of about 0.04 inches.

Still referring to FIG. 1, thermoplastic sheet 40 has a first surface 42, and a second surface 44. Second thermoplastic sheet 40 may be comprised of any of a variety of thermoplastic materials that have physical and chemical properties suitable for the method and article of manufacture. Thermoplastics suitable for use in sheet 40 include thermoplastics selected from the list of materials found in Table II.

Still referring to FIG. 1, in one embodiment the length 27 of first sheet 20 and the length 47 of second sheet 40 are substantially the same while the length 37 of core member 30 is substantially less than the lengths 27 and 47 of first sheet 20 and second sheet 40, respectively. Similarly, the width 26 of first sheet 20 and the width 46 of second sheet 40 are substantially the same, while the width 36 of core member 30 is substantially less than the widths 26 and 46 of first sheet 20 and second sheet 40, respectively.

FIGS. 2-7 illustrate at least two embodiments. One embodiment illustrated in FIGS. 2-7 is a method for forming load-bearing articles having a shape defining compressible core and a shell formed from at least two heated thermoplastic sheets. An additional embodiment illustrated in FIGS. 2-7 is components of an apparatus that may be used to form load-bearing articles having a shape defining compressible core and a shell formed from at least two heated thermoplastic sheets.

Figure 2:
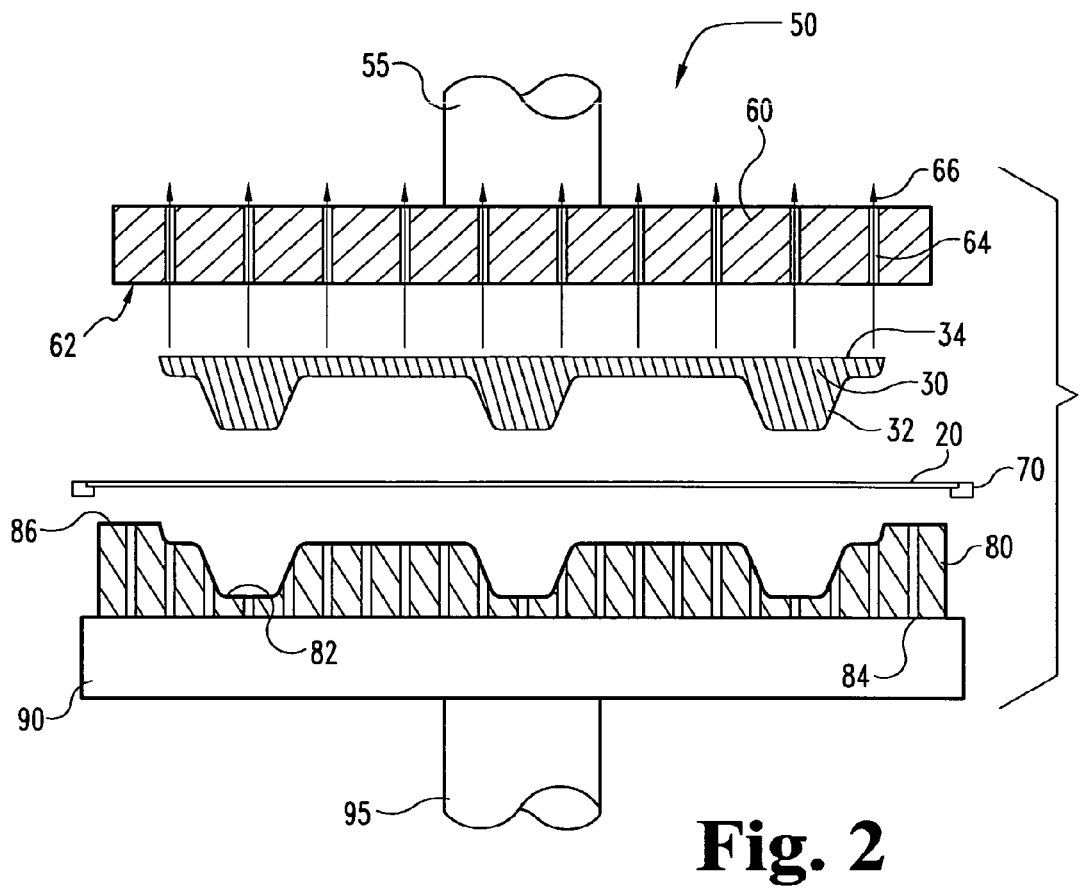
FIG. 2. A stylized side view of one embodiment illustrating steps in the process of forming load-bearing articles. A heated thermoplastic sheet is positioned between a shape-forming core and a female mold.

Referring now to FIG. 2, a stylized side cross-sectional view 50 illustrates some of the steps and some of the components of the apparatus used in at least one embodiment. First platen 60 has a first surface 62, and is operatively connected to drive 55. Drive 55 is operatively connected to a means (not shown) for moving first platen 60 relative to other components of the apparatus. Drive 55 may be actuated mechanically, pneumatically, hydraulically, or by any other means known in the art.

Still referring to FIG. 2, operatively positioned beneath first surface 62 of platen 60 is shape forming compressible core member 30. The second surface 34 of core member 30 is complimentary in shape to the first surface 62 of first platen 60. Operatively positioned directly beneath the first surface 32 of core member 30 is heated pliable first thermoplastic sheet 20. The edges of first sheet 20 are operatively connected to clamping frame 70. Clamping frame 70 operatively positions first sheet 20 such that the interior, but not the edges, of first sheet 20 are positioned between first surface 32 of core member 30 and the first surface 82 of mold 80. Typically, thermoplastics used in the process are heated until they are pliable using either infrared or convection heating, a combination of the two, or any other suitable means of heating thermoplastics known in the art.

Referring still to FIG. 2, in one embodiment the bottom of molding tool 80 rests on, or is attached to, optional second platen 90. Optionally, second platen 90 is operatively connected to drive 95. Drive 95 is operatively connected to a means (not shown) for moving second platen 90 relative to other components of the apparatus, for example, first platen 60. Drive 95 may be actuated mechanically, pneumatically, hydraulically, or by any other means known in the art.

Figure 3:
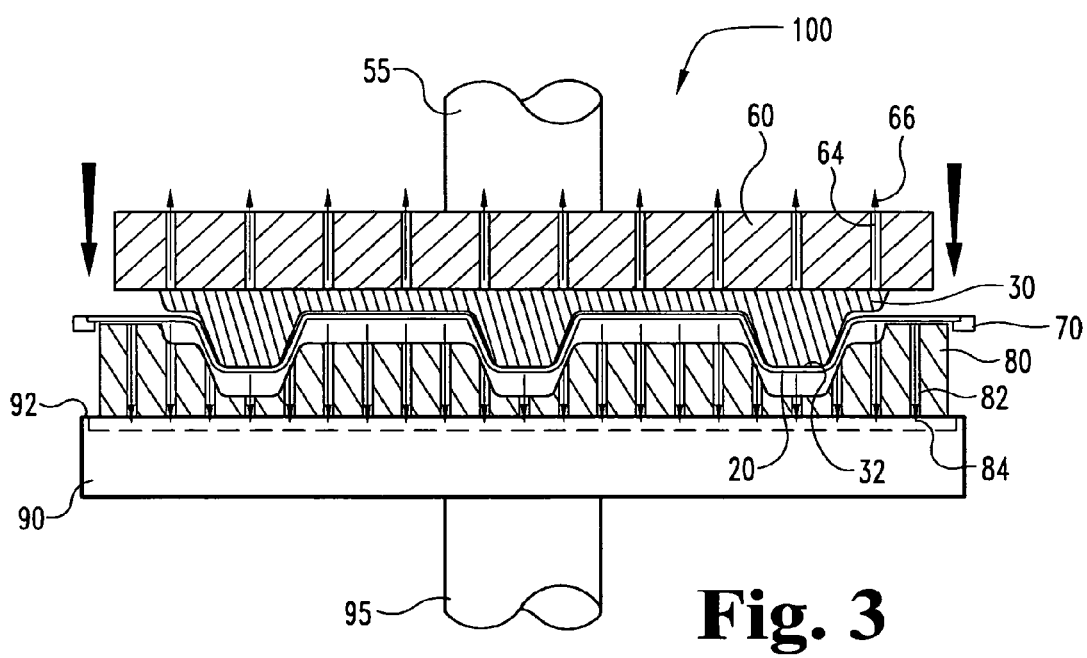
FIG. 3. A stylized side view of one embodiment illustrating steps in the process of forming load-bearing articles. A heated thermoplastic sheet is engaged with one surface of a shape-forming compressible core.

As illustrated in FIG. 2, surface 62 of platen 60 (or an optional first molding tool, not shown) are perforated. A plurality of channels 64 extend through platen 60 and are operatively connected to a vacuum source (not shown). As illustrated in FIG. 3, vacuum may be applied to channels 64 and used to operatively hold core member 30 in the center of the first surface 62 of platen 60. As illustrated in FIG. 3, in one embodiment mold 80 has a perforated first surface 82, holes in surface 82 are operatively connected to a plurality of channels 84. Channels 84, extending through mold 80, are operatively connected to a vacuum source (not shown).

Still referring to FIG. 3, clamping frame 70 holding the perimeter of heated first thermoplastic sheet 20 advances relative to mold 80 such that a portion of the edge of sheet 20 is in contact with the uppermost edge 86 of mold 80. Next core member 30 attached to first surface 62 of platen 60 through vacuum 66 applied to channels 64 are advanced towards first thermoplastic sheet 20. The movement of core member 30 relative to first sheet 20 may be accomplished by moving platen 60 via activation of drive 55, or by moving platen 90 via activation of drive 95, or moving both first platen 60 and second platen 90 relative to one another. First surface 82 of mold 80 is complimentary (in general shape) to first surface 32 of core member 30.

Figure 4:
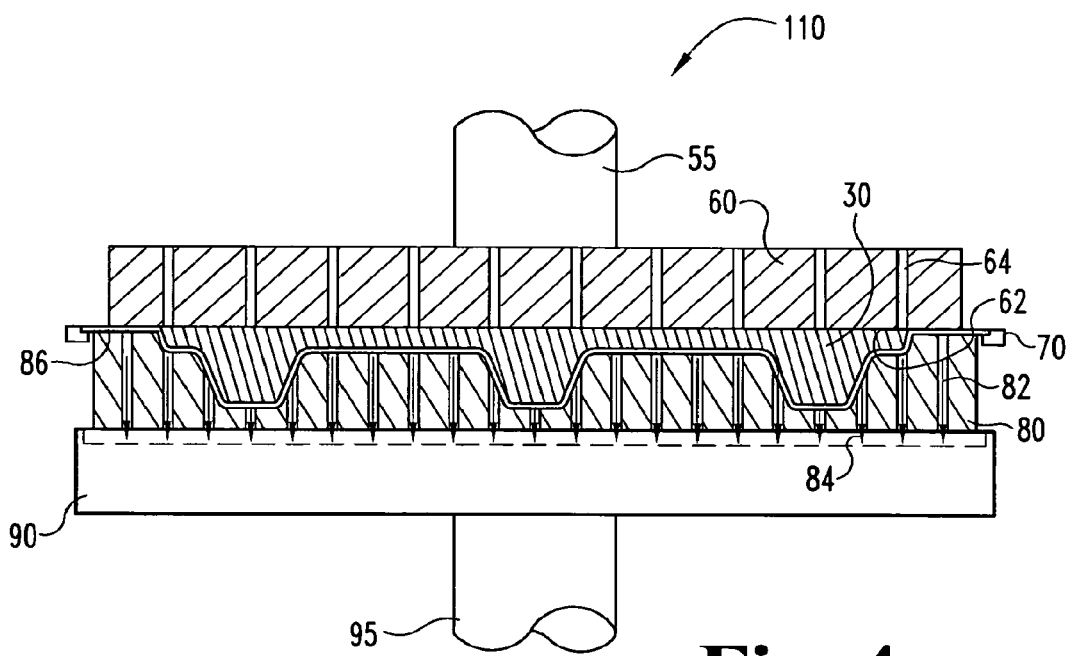
FIG. 4. A stylized side view of one embodiment illustrating steps in the process of forming load-bearing articles. A heated thermoplastic sheet is engaged with one surface of a shape-forming compressible core and a perforated inner surface of a female mold.

Referring now to FIG. 4, the volume defined by the perimeter of compressible core member 30 is larger than the interior volume of the space defined by contacting the edge of first platen 60, surface 62 and the edge 86 of mold 80. Once sheet 20 and core member 30 are in position the distance between mold 80 and platen 60 is decreased. The distance is decreased until the perimeter of heated first thermoplastic sheet 20 is pressed between the uppermost outer surface 86 of mold 80 and the edge of surface 62 of first platen 60.

Referring again to FIG. 4, advancing first platen 60 until the edge of first sheet 20 is pressed against the uppermost edge 86 of mold 80 compresses core member 30. At this stage in the process vacuum 66 to channel 64 (see FIG. 3) is turned off. And as illustrated in FIG. 4 vacuum 85 is applied to channels 84 through mold 80. Next (referring now to FIG. 5) platen 60 is withdrawn relative to mold 80. Vacuum 84 is maintained to hold sheet 20 in contact with surface 82 of mold 80. Heat induced bonding between core member 30 and first thermoplastic sheet 20 holds core member 30 substantially in place.

Figure 6:
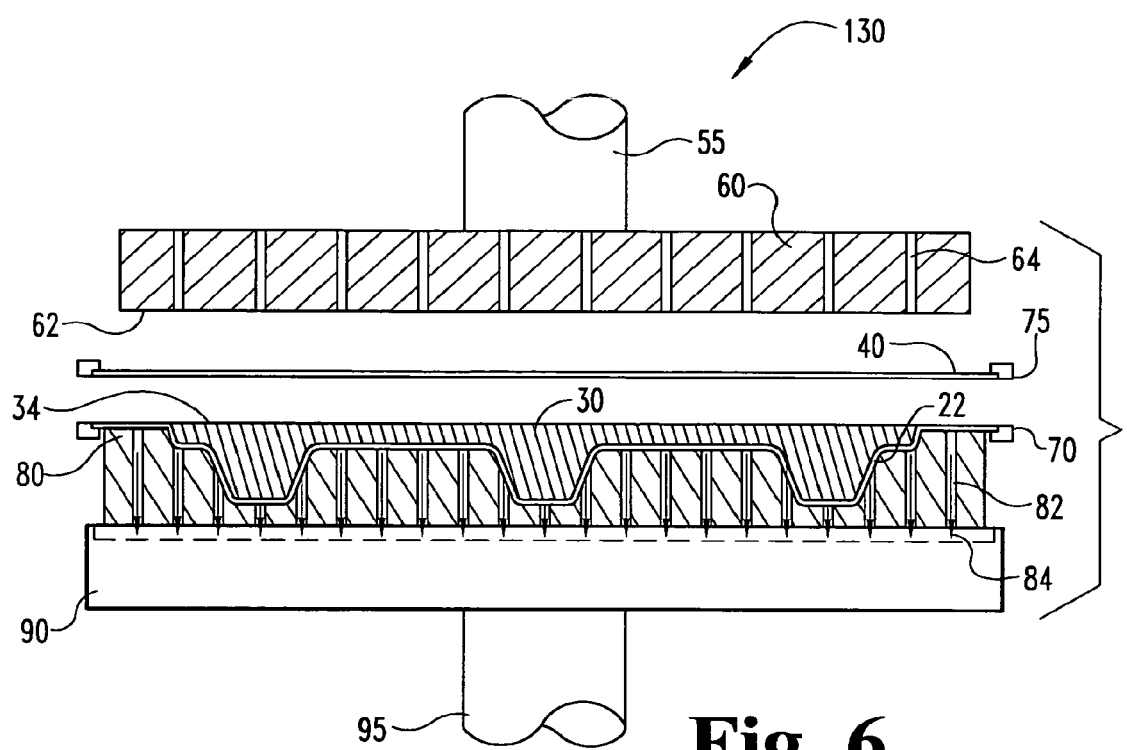
FIG. 6. A stylized side view of one embodiment illustrating steps in the process of forming load-bearing articles. A heated thermoplastic sheet is engaged with one surface of a shape-forming compressible core and a perforated inner surface of a female mold. A second heated thermoplastic sheet positioned between the first platen and a surface of a shape-forming compressible core member.

Referring now to FIG. 6, platen 60 is withdrawn relative to mold 80 at least far enough to allow second thermoplastic sheet 40 to be operatively positioned between first surface 62 of platen 60 and second surface 34 of core member 30. In one embodiment, heated second thermoplastic sheet 40 is held in place by clamping the edges of sheet 40 to optional second clamping frame 75.

Figure 5:
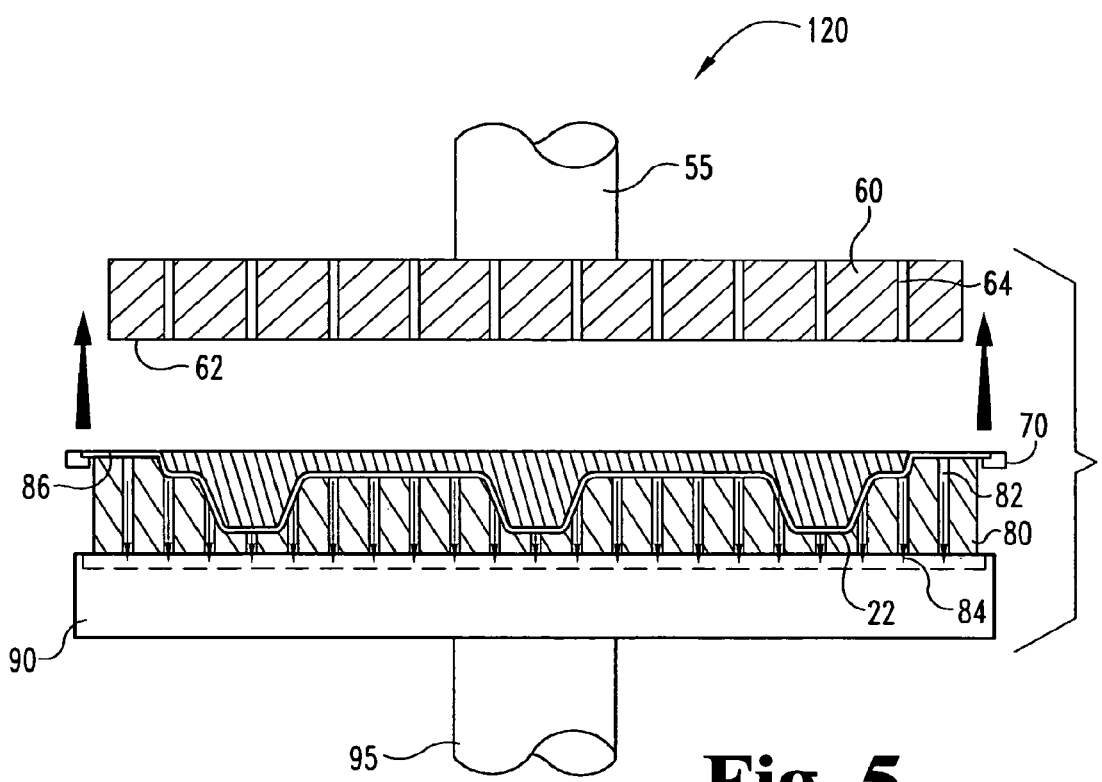
FIG. 5. A stylized side view of one embodiment illustrating steps in the process of forming load-bearing articles. A heated thermoplastic sheet is engaged with one surface of a shape-forming compressible core and a perforated inner surface of a second molding tool and a first molding tool disengaging from a surface of the shape forming compressible core member.
Figure 7:
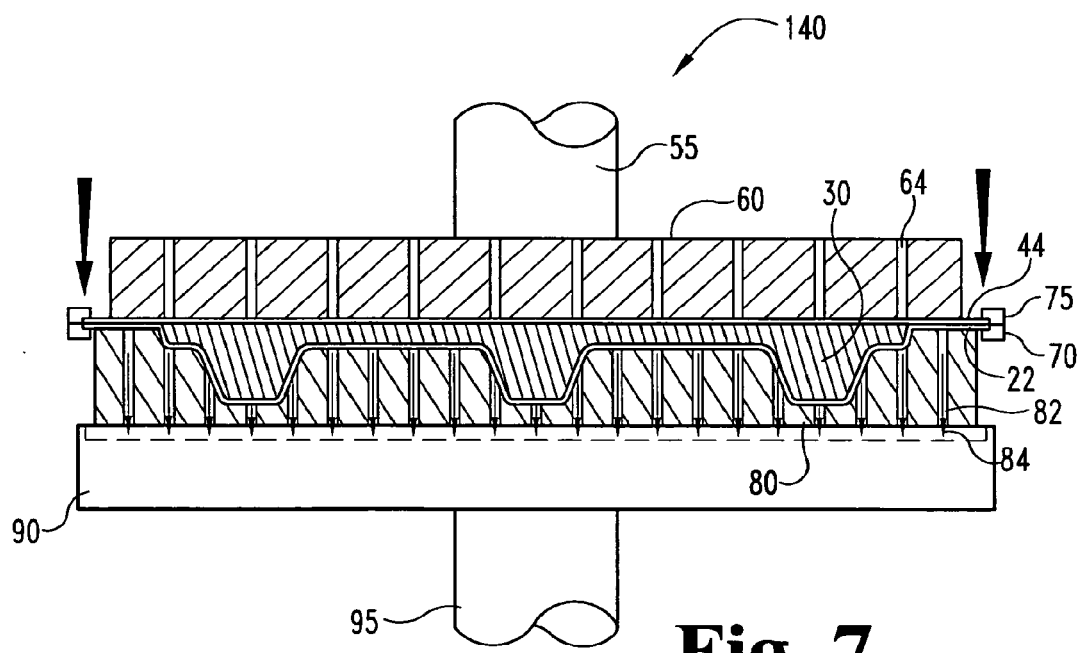
FIG. 7. A stylized side view of one embodiment illustrating steps in the process of forming load-bearing articles. A first heated thermoplastic sheet is engaged with one surface of a shape-forming compressible core and a perforated inner surface of a female mold. A second heated thermoplastic sheet is engaged with a surface of a compressible core member and the surface of the first platen.

In one embodiment, vacuum 64 (as shown in FIG. 5) is applied to surface 62 of platen 60 to help, shape, stabilize, and position second sheet 40, positioned between core member 30 and platen 60 as illustrated in FIGS. 6 and 7. Once sheet 40 is firmly in contact with the core member 30 and the edges of sheet 20 the vacuum to platen 60 may be turned off.

Referring now to FIG. 7, once heated second thermoplastic sheet 40 is operatively positioned between first surface 62 of first platen 60 and second surface 34 of compressible core member 30, the distance between first platen 60 and mold 80 is decreased. In one embodiment the distance between platen 60 and molding tool 80 is decreased by moving platen 60 through activation of drive 55. In another embodiment the distance between platen 60 and molding tool 80 is decreased by activating drive 95 operatively attached to second platen 80 which supports (or is attached to) mold 80. In yet another embodiment, moving both first platen 60 and second platen 80 decreases the distance between platen 60 and mold 80.

Still referring to FIG. 7, the distance between platen 60 and molding tool 80 is decreased until the edge of heated second thermoplastic sheet 40 contacts the edges of heated first thermoplastic sheet 20 resting on edge 86 of mold 80. Once the edges of first thermoplastic sheet 20 and second thermoplastic sheet 40 contact one another the interior of heated second thermoplastic sheet 40 contacts and further compresses core member 30. In one embodiment vacuum 85 through channels 84 in molding tool 80 is maintained throughout these steps to insure that first sheet 20 remains in contact with interior surface 82 of molding tool 80.

Platen 60 and molding tool 80 are held in place. Portions of sheets 20 and 40 in contact with one another, for example, the edges 86 bonded together. Bonding can be promoted by use of ultrasonic or hot air welding. The components are held in place under pressure until the article cools and the bond between sheets 20 and 40 strengthens. In one embodiment virtually the entire surface of compressible core member 30 remains in contact with the interior of the space between first thermoplastic sheet 20 and second thermoplastic sheet 40.

In one embodiment heat from heated first thermoplastic sheet 20 and heat from heated second thermoplastic sheet 40 promotes bonding between the interior surface of the shell formed by thermoplastic sheet 20 and 40 and the surface of compressed core member 30.

Embodiments, in addition to the ones illustrated in FIGS. 1-11, are envisioned and claimed. By way of example, and not of limitation, some of these embodiments are as follows.

One embodiment is a method for forming load-bearing articles comprising a shape defining compressible core and a thermoplastic external shell. This method includes the steps of providing a shape defining compressible core member that is larger before it is compressed than it is after it is compressed and incorporated into a load-bearing article. Additional steps include stacking the core member between chemically compatible heated thermoplastic sheets, using a first platen and second platen. The second platen may include an optional attached second molding tool. The mold has a first surface complimentary to the shape of the first surface of the shape-forming compressible core member. The sandwich can be compressed by moving either, or both, the first and second platens towards one another. The core-compressing step also brings complimentary portions of the first and second heated thermoplastic shells into contact with one another. Pressure is applied to the sandwich until the article cools forming bonds between portions of the thermoplastic shell in contact with one another.

In one embodiment portions of the two sheets in contact with one another are welded together. Welding may be performed using ultrasonic welding, hot air welding, or any other suitable means known in the art.

In one embodiment bonds also form between portions of the compressed core member in contact with the interior surface of the thermoplastic shell.

In one embodiment the first platen (or optionally a first molding tool attached to the first platen) includes a means for reversibly attaching a shape forming compressible core member to the first surface of the platen. Such means include, for example, a set of perforations in the first platen surface connected to a vacuum source. Vacuum is used to reversibly attach an operatively positioned core member to the surface of the first platen. Next a heated thermoplastic sheet attached to a clamping frame is positioned between the first surface of the core member and the surface of the mold. A clamping frame is sized and positioned such that the frame itself does not interfere with the relative movement of the first platen and mold relative to one another. The clamping frame holds the first heated thermoplastic sheet and maintains the original length, width, and shape of the perimeter of the sheet. In one embodiment the first platen moves the core member into contact with the interior of the heated sheet.

The core member partially compresses once it contacts the interior of the first heated pliable thermoplastic sheet. The interior of the first heated sheet deforms and at least partially conforms to the contour of the first surface of the core member. The first platen continues to advance moving both the core member and the interior portion of the heated first thermoplastic sheet until the sheet contacts the first surface of the molding tool attached to the second platen. This presses a portion of the first heated sheet between the core member and interior surface of the mold. In one embodiment heat transfer between the core member and first heated sheet promotes the formation of bonds between portions of the core member and first sheet in contact with one another.

In one embodiment the interior surface of the molding tool attached to the second platen is perforated. These perforations are connected to a vacuum source. When the first heated sheet nears the surface of the second molding tool, vacuum is applied to the surface of the second molding tool to help hold the first heated sheet to the surface of the second molding tool.

In a subsequent step vacuum is withdrawn from the first molding tool thereby releasing the core member from the surface of the first platen. The first platen is withdrawn at least far enough to allow a second heated thermoplastic sheet to be positioned between the first molding tool and the second surface of the core member. The second heated thermoplastic sheet may be attached to an optional second clamping frame.

The clamping frame operatively positions the heated second thermoplastic sheet between the first platen and the molding tool housing the first thermoplastic sheet and partially compressed core member. The optional second clamping frame also helps to maintain the original length, width, and shape of the perimeter of the second heated sheet. Next, the distance between the first and second platens is reduced until the second heated sheet contacts the interior portion of the second surface of the core member. Similarly, as the distance between the platens decreases complimentary portions of the first and second heated sheets contact one another. In one embodiment the platens come to rest relative to one another when the core member is compressed and the edges of the first heated thermoplastic sheet are pressed together.

Pressure is maintained on the stack (sandwich) formed by the first heated sheet, compressed core member, and second heated sheet until the article cools enough for bonds to form between sections of the two thermoplastic sheets in contact with one another. In one embodiment as the article cools bonds also form between the surface of the compressed core member and interior surface of the thermoplastic sheets in contact with one another.

In one embodiment the edges of the two sheets in contact with one another are pinched together to ensure a strong bond between the edges of the first and second heated sheets.

In a final series of steps the article is removed from between the first and second platens. In an optional step excess material is trimmed from the exterior of the article.

Parameters known in the art to impact the quality of the article formed and the efficiency of the process can be controlled throughout the process. This includes parameters such as heat, pressure, vacuum, timing of each step, and the like. The process can be automated to varying degrees depending, in part, upon the equipment used and the discretion of the operator.

In one embodiment the shape defining compressible core member is shaped by steam chest molding using an aluminum mold before the core member is incorporated into a load-bearing article.

In one embodiment the materials comprising the shell (thermoplastic sheets) and the compressible core are chemically compatible. In one embodiment these materials bond together when they are heated, held in contact with one another, and permitted to cool together. Examples of compatible thermoplastic sheet and compressible core members include combinations such as TPO and EPP, or HDPE and PE, or other combinations of chemically compatible thermoplastic materials and compressible core members as are known in the art.

In one embodiment, heat from the heated thermoplastic sheets encapsulating the compressible core member promotes bonding between the core member and heated thermoplastic sheet comprising the shell of the article.

In another embodiment, the surface of the shape defining core member is coated with a thermo-activated adhesive before it is placed in contact with, and compressed between, the heated thermoplastic sheets comprising the shell of the article.

Another embodiment is an apparatus for manufacturing load-bearing articles comprising a shape defining compressible core member and thermoplastic shell. Components of the apparatus include a first platen and a second platen movable with respect to one another. In one embodiment the platens can be moved so as to decrease or increase the distance between the platens. The platens can be moved by any of the following means: mechanical, pneumatic, hydraulic, or any combination of means thereof, or any other means known in the art.

In one embodiment the first molding tool attached to the first platen includes a perforated first surface. The perforations in the first surface are connected to a vacuum source. Vacuum is controllably applied to reversibly attach a shape defining compressible core member to the first surface of the first platen.

At least one surface of the molding tool is complimentary to the contour of at least one surface of the shape defining compressible core member. In one embodiment a mold is associated with a second platen. In another embodiment a mold replaces the need for a second platen.

In still another embodiment a second platen replaces the need for a separate molding tool. This second platen has a surface that is complimentary to the contour to at least one surface of the shape defining compressible core member.

In one embodiment the mold includes a series of perforations in the surface of the mold facing the complimentary surface of the core member. The perforations in the surface are connected to a vacuum source.

In one embodiment the mold is a female mold with a concave interior surface complimentary to the convex surface of the shape defining compressible core member. The volume defined by the concave interior of the female mold is less than the volume defined by complimentary convex shape of the uncompressed compressible core member.

In one embodiment the apparatus further includes a means for heating thermoplastic sheets to a temperature range suitable for shaping the sheets and forming bonds between sheets. Means for heating the thermoplastic sheets include infrared, convection heating, combinations of thereof, and any other suitable means known in the art.

In one embodiment the apparatus includes a means for attaching, holding, and positioning heated thermoplastic sheets between the platens of the apparatus. In one embodiment these means for sheet handling includes at least one clamping frame. The interior of the clamping frame is large enough to hold the heated sheet such that the first platen and top edge of the mold (or top edge of the second platen) can move relative to one another without contacting the clamping frame.

In one embodiment the apparatus includes a means for cooling the article. Cooling means include devices that directly apply cooling sprays comprising, for example, air, water, and the like to the article. Alternatively, cooling devices may operate to cool the article by cooling components of the device in direct or indirect contact with the article.

In one embodiment the apparatus further includes a steam-molding chest for shaping the compressible core member before it is incorporated in the article.

In another embodiment the apparatus includes a pinching mechanism for applying directed pressure to the edges of the first and second heated sheet in direct contact with one another. In one embodiment the edges of the two heated sheets in contact with one another are kept under pressure until the article cools and bonds form between the edges of the sheet in contact with one another.

In still another embodiment the apparatus includes a means for applying a coating of thermo-activated adhesive to the surface of the core member. Adhesive is applied before the core member is placed in contact with the heated thermoplastic sheets comprising the thermoplastic shell. The adhesive may be applied by use of a sprayer, roller, dipper, or any other means for coating a surface known in the art. Alternatively, thermo-activated adhesives may be applied directly to portions of the heated thermoplastic sheets that are intended to contact one another or portions of the core member.

One embodiment is a load-bearing article comprising a shape defining compressible core member compressed within a shell including thermoplastic components.

In one embodiment the materials included in the core member and in the thermoplastic shell are chemically compatible. Chemically compatible materials bond together when they are heated, held in contact with one another, and allowed to cool.

In one embodiment the thermoplastic shell comprises a plurality of sheets shaped to conform to the contour of the compressed shape of the shape defining core member. The sheets are bonded to one another along the edges of the sheets. In one embodiment, the two sheets are bonded to one another, at least one other area of contact between the two sheets (in addition to the edges of the article).

In one embodiment the compressible core member, is further compressed as the thermoplastic shell cools and contracts.

In one embodiment the shape defining compressible core member is first shaped by steam chest molding before the core member is incorporated into a load-bearing article. One means for steam chest molding that may be used includes an aluminum mold.

In one embodiment the thermoplastic sheet material includes thermoplastic olefin (TPO). TPO may be supplemented with compounds, including but not limited to, talc, calcium carbonate, and various pressing aids known in the art.

In one embodiment, the sheets of TPO used to form the shell range in thickness from about 0.04 to 0.08 inches.

In another embodiment the sheets of TPO used to form the shell range in thickness from the shell is about 0.04 inches.

In one embodiment the materials comprising the shell (thermoplastic sheets) and the compressible core are chemically compatible. In one embodiment these materials bond together when they are heated, held in contact with one another, and permitted to cool together. Examples of compatible thermoplastic sheet and compressible core members include combinations such as TPO and EPP, or HDPE and PE, or other combinations of chemically compatible thermoplastic materials and compressible core members as are known in the art.

In one embodiment the article is a pallet. Pallets made using the methods of this invention include pallets suitable for use in a wide variety of applications. Table V lists some of the defining properties of some of pallets that can be made according to some embodiments of the invention. Table V also includes information on the applications for these pallets and the industries where they are likely to be used.

TABLE V

Properties of specific types of pallets, and some specific applications for pallets with these properties.

| Pallet Property | Application | Industry |
| --- | --- | --- |
| Cost Effective | any shipping | all |
| Reusable | any shipping (especially closed loop) | all |
| Light Weight | any shipping | all |
| Ergonomic | Any shipping | all |
| Durable | any shipping | all |
| 4-way Entry | any shipping | all |
| Non-slip Surface | any shipping | all |
| Moisture Resistant | any shipping | all |
| Water Repellant, Draining | any shipping | all |
| Pest Resistant | any shipping | all |
| Shock Absorption | High value/sensitive cargo | High tech perishable |
| Fire Retardant | any shipping | all |
| Aesthetics | any shipping | all |
| Easily Modified | all | all |
| Multicolor Option | Food, manufacturing, chemical | all |
| Recyclable | any shipping | all |
| Mold/Mildew resistant | any shipping | all |
| Stackable/Nestable | any shipping | all |
| Rigid - rackable | any warehousing | all |
| Compatible with conveyors/material handling systems | Any warehousing application | all |
| Smooth Surface | Sanitary requirements | Food-interplant, pharmaceutical |
| Insulating | Perishable | Food, pharmaceuticals, biotechnology |
| Bandable | High tech, heavy | High value/heavy industry |
| Chemical Resistant | Chemical, pharmaceutical | Chemical, pharmaceutical |
| Repairable | Any shipping | All with closed loop |
| Temperature Resilient | Food | Food |
| Anti static | Electronics, flammables | High tech, chemical |
| UV resistant | Any shipping | all |
| Radio Frequency Identification (RFID) tag | Primarily high value or time sensitive | Pharmaceuticals, Food, high tech; tracked inventory |
| Sealed | all | all |
| Different Sizes | all | all |

Figure 8:
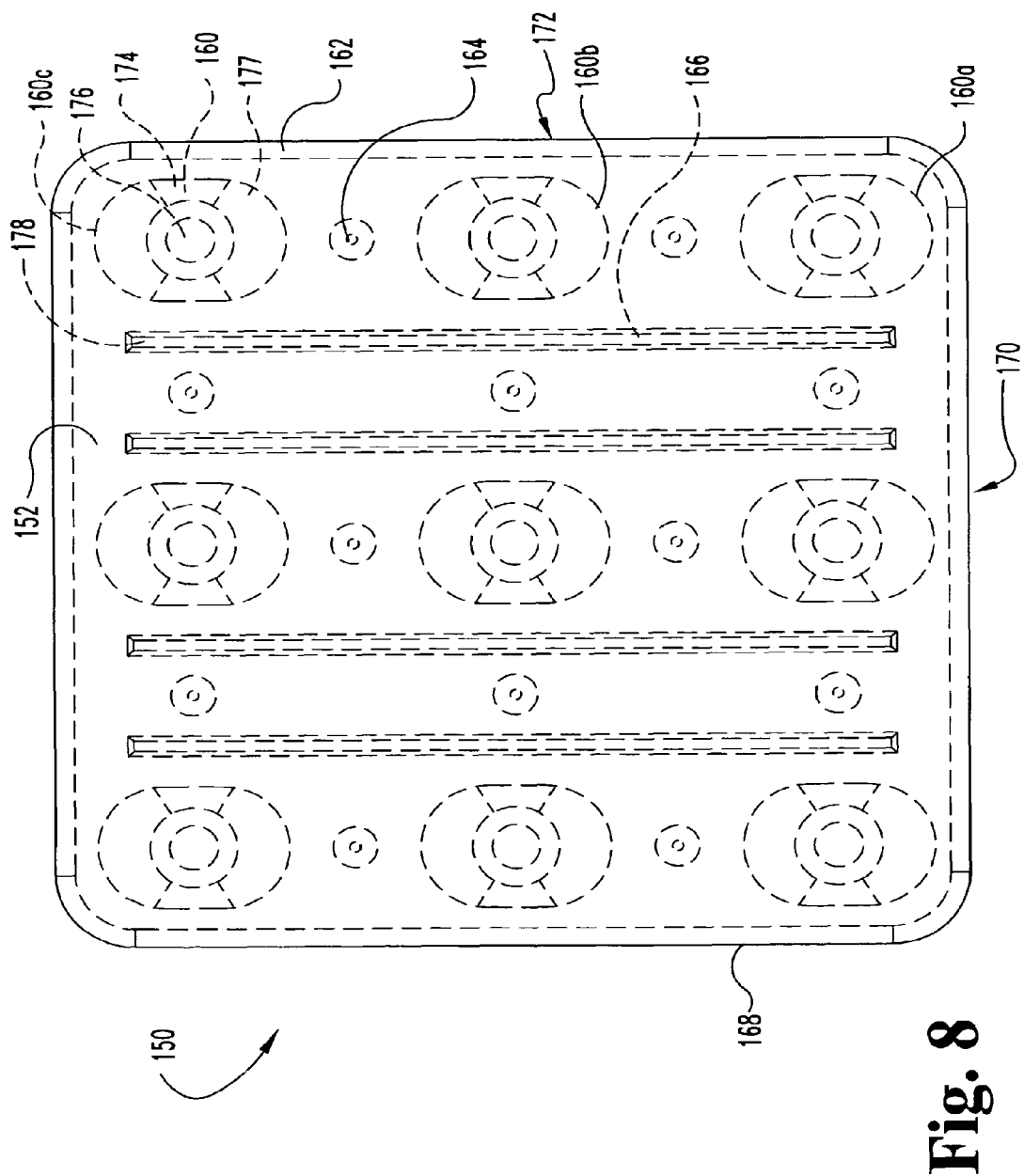
FIG. 8. A top view of one embodiment, a pallet formed in part by compressing a shape-forming compressible core member between two heated thermoplastic sheets.

Referring now to FIG. 8, one embodiment is pallet 150. Pallet 150 includes a deck 151 having an upper surface 152 and lower surface 156 (illustrated in FIG. 11). Referring again to FIG. 8, upper surface 152 of deck 151 is substantially flat. In one embodiment upper surface 152 includes grooves (not shown), perpendicular to the front edge 170, and parallel to the edge 172 of pallet 150. Although not shown the upper surface 152 may include a variety of features to add surface area and help to prevent materials placed on surface 152 from sliding off pallet 150.

Still referring to FIG. 8, as illustrated pallet 150 includes nine legs 160, arranged in three sets of three legs in each set. Each leg 160 is contiguous with lower deck 156 (see FIG. 11). Each leg 160 has a substantially elongated oval shape 174 where it protrudes from lower surface 156 of pallet 150. Each leg has a substantially round bottom 176. The round bottom 176 of each leg 160 is substantially flat and parallel with the upper surface 152 of deck 151.

Referring again to FIG. 8, two pairs of grooves 178 are formed in the lower surface 156 of pallet 150. Grooves 166, illustrated in side view, are optionally placed in pairs between each adjacent set of three legs 160. Thermoplastic sheets used to form the upper 152 and lower 156 (see FIG. 11) surfaces of deck 151 (referring again to FIG. 8) are joined together along edge 168. These sheets are also joined together by a series of bonding spots (divots) 164 located one between each adjacent set of legs 160.

Figure 9:
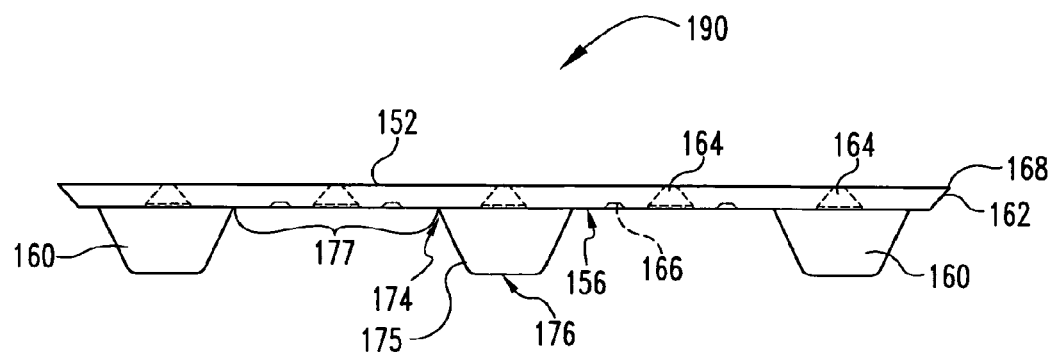
FIG. 9. A side view of the front of one embodiment, a pallet formed in part, by compressing a shape-forming compressible core member between two heated thermoplastic sheets.

Referring now to FIG. 9, a side view 190, of the front of pallet 150. Upper surface 152 and lower surface 156 of deck 151 are joined by tapered edge 162. The twin thermoplastic sheets comprising upper surface 152 and lower surface 156 are joined together along edge 168 and at bonding points 164. The slightly oval shaped bottom 176 of leg 160 is joined to the top 177 of leg 160 by leg side 175. Legs 160 are conical and tapered from where leg 160 joins the lower surface 156 of deck 151.

Figure 10:
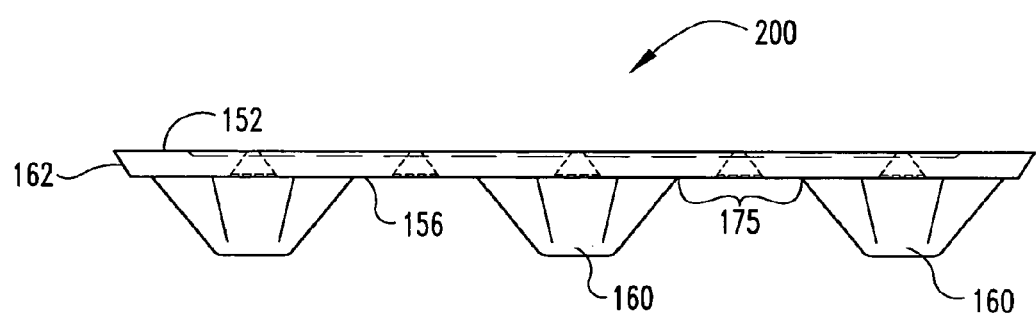
FIG. 10. A side view of one side of one embodiment, a pallet formed in part, by compressing a shape-forming compressible core member between two heated thermoplastic sheets.

Referring now to FIG. 10, a side view 200, of the side of pallet 150. The distance 175 between legs 160 along side view 200 is less than the distances 177 between legs 160 illustrated in view 190 shown in FIG. 9. In this embodiment distances 177 (FIG. 9) and 175 (FIG. 10) are made such that it is easier for forks to slide between legs 160 from front 170 (as illustrated in FIG. 8) than from side 172 (as illustrated in FIG. 9).

Figure 11:
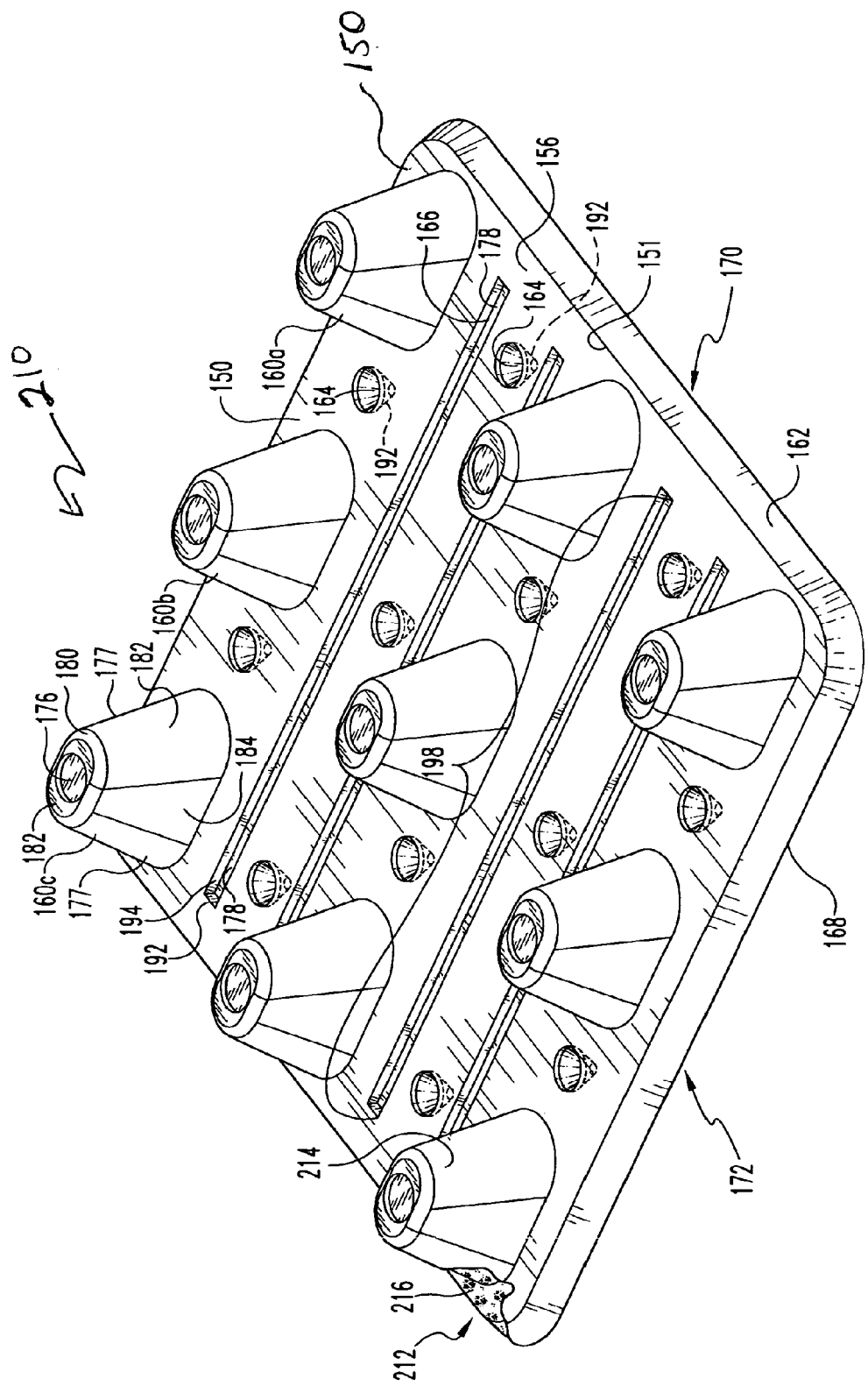
FIG. 11. A perspective view of the underside of one embodiment, a pallet formed in part, by compressing a shape-forming compressible core member between two heated thermoplastic sheets.

Referring now to FIG. 11, a perspective view 210 of pallet 150. The bottom 180 of leg 160 has a partially recessed surface 176 is offset by the width of edge 182. The side 184 of leg 160 is parallel to the side 172 of pallet 150 and parallel to the front 170 of pallet 150. The front 182 of leg 160 is contiguous with the side 184 of leg 160. The portion of leg 160 where it emerges from lower surface 150 of deck 151 has an elongated oval shape 177.

Still referring to FIG. 11, tapered edge 162 joins upper surface 152 (shown in FIG. 8) of deck 151 with the lower surface 156 (shown in FIG. 11) of deck 151. In one embodiment thermoplastic sheet comprising upper surface 152 (shown in FIG. 8) and lower surface 156 (shown in FIG. 11) of deck 151 are joined together along edge 168 and at various bonding spots (divots) 164. Grooves 178 extend parallel to side 172. Each groove 178 is substantially rectangular in shape having a width 192, a depth 194 and a length 198. The length 198 of groove 178 is less than the length measured from the front of first leg 160*a* to the back of third leg 160*c*.

Again referring to FIG. 11, divots 164 are domed shaped features extending through the depth of 162 of deck 150 to join the thermoplastic sheets comprising upper deck surface 152 and lower deck surface 156. In one embodiment these features 164 are positioned between each adjacent pair of support legs 160. Features 144 contribute to the strength and stability of pallet 150, in part, by providing points of contact and bonding between upper deck 152 and lower deck 156. The dome shape of 164 also helps to strengthen pallet 150.

The dome shape of 164 serves to distribute some of the downward force of loads place on upper deck 152 to the lateral components of lower deck surface 156. This distribution of load to the flat areas of 156 buttressing the bottom of domed divot 164 adds to the load-bearing capacity of pallet 150. Divots 164 also increase the surface area 192 of contact between the shell 214 and core 216 of pallet 150, as illustrated in cut away 212. In one embodiment core member 216 is bonded to the interior of the shell 214. Bonding between core 216 and shell 214 contributes to the strength and durability of pallet 150. Therefore by increasing the bonding surface between core 216 and shell 214 divots 164 help to strengthen and stabilize pallet 150.

Still referring to FIG. 11, as illustrated in cutaway 212, compressible core member 216 substantially fills all spaces formed by the interior of legs 160 and deck 151. The surface of core member 216 is substantially in contact with the interior surface of shell 214 bounded by the inside surfaces of legs 160 and deck 151.

In addition to the embodiment illustrated in FIGS. 8-11, additional pallet structures are also within the scope of the invention. These embodiments include the following.

In one embodiment foot members are positioned to support the deck and to allow ready transport of the pallet by forklift trucks, shipping crane cradles, and the like.

In one embodiment the pallet has nine legs. The nine legs are arranged uniformly in three sets of three legs each. Each leg is a conical oval; wider where it emerges from the bottom of the first deck and narrower at a point furthest from the deck.

In another embodiment the pallet has six legs. The six legs are uniformly arranged in three rows of two legs each.

In one embodiment the upper surface of the deck is comprised of a second thermoplastic sheet and the lower surface of the deck and the legs are comprised of a first thermoplastic sheet. The two sheets are joined together at the edge of the deck and at additional areas evenly spaced between each pair of legs. In these regions, much like at the edge of the deck, there is no compressed core member material between the bonded thermoplastic shell components.

In one embodiment the upper surface of the pallet deck includes grooves or other features that aid in creating a skid resistant surface.

In one embodiment the shell of the pallet is made from material including thermoplastic olefin (TPO). One type of TPO that may be used in the manufacture of the pallet is SEQUEL E3000 available from SOLVAY. Any thermoplastic with similar chemical and physical properties may also be used in the manufacture of the pallet.

In one embodiment the TPO used in the shell of the pallet further includes talc, calcium carbonate and/or pressing aids.

In one embodiment the exterior of the pallet is comprised of sheets TPO with a thickness in the range of about 0.04 to 0.08 inches.

In another embodiment the exterior of the pallet is comprised of sheets TPO with a thickness of about 0.04 inches.

In one embodiment the compressible core member of the pallet includes Expandable Polypropylene (EPP). In one embodiment the compressible core member of the pallet includes EPP, with a density in the range of about 1.9 to 5.0 pounds per cubic foot (lbs./ft.$^3$).

In another embodiment the compressible core member of the pallet includes EPP, with a density of about 1.9 pounds per cubic foot (lbs./ft.$^3$).

One embodiment is a pallet comprising a shape defining compressible core member and a thermoplastic shell chemically compatible with the core member. One such pallet is manufactured by compressing a core member comprising Expandable Polypropylene (EPP) with a density of about 1.9 to about 5.0 foot pounds per cubic foot (lbs./ft.$^3$) with a thermoplastic olefin (TPO). In one embodiment two sheets of TPO on the order of 0.04 to 0.08 inches thick are used to create the shell and help compress the core member.

EXAMPLES

For the purpose of promoting further understanding and appreciation of the present invention and its advantages, the following Examples are provided. It will be understood, however, that these Examples are illustrative and not limiting in any fashion.

Example 1

A Four-Station Rotary Twin Sheet Thermoformer manufactured by BROWN was used to produce a load-bearing article in the shape of a pallet. The finished pallet was 24 inches wide and 40 inches long. The pallet had two sets of three legs each (one set of legs fewer than the pallet illustrated in FIGS. 8-11).

The pallet was constructed from two 28 inch wide by 44 inch long sheets of Thermoplastic Olefin TPO. The TPO used in this example was manufactured by SOLVAY and has brand name SEQUEL E3000. Each sheet of TPO was on the order of inches thick. The pallet core member was approximately 24 inches wide and 40 inches long. The overall shape of the core member included two sets of three legs.

The setting of the Thermoforming Machine used are listed in Table VI.

TABLE VI

Machine settings for the BROWN Four-Station Rotary Twin Sheet Thermoformer used in manufacture the pallet of Example 1.

| FORM FUNCTION CYCLE TIMERS | SECONDS |
|---|---|
| Top Plat Down Long | 0.10 |
| Top Plat Down Short | 0.10 |
| Bot Plat Up Long | 5.00 |
| Bot Plat Up Short | 2.00 |
| Cooling Fans On | 20.00 |
| Rimlock Long Cycle | 60.00 |
| Cooling Delay | 250 |
| Lube Cycle Count | 10 |
| Top Plat Up Long | 56.00 |
| Top Plat Up Short | 8.00 |
| Bot Plat Down Long | 54.00 |
| Bot Plat Down Short | 10.50 |
| Cooling Fans Off | 45.00 |
| Rimlock Short Cycle | 17.00 |
| Clamp Frame Open in Form | 10.00 |
| Lube Cycle Duration | 3.00 |

| VACUUM FORMING FUNCTIONS | SECONDS |
|---|---|
| Top Main Vac #1 On | 0.00 |
| Top Main Vac #2 On | 4.00 |
| Bot Main Vac #1 On | 9.00 |
| Bot Main Vac #2 On | 0.00 |
| Top Air Eject #1 On | 0.00 |
| Top Air Eject #2 On | 55.00 |
| Bot Air Eject #1 On | 53.00 |
| Bot Air Eject #2 On | 7.00 |
| Vacuum Bleed #1 On | 7.00 |
| Vacuum Bleed #2 On | 0.00 |
| Vacuum Pull #1 On | 0.00 |
| Vacuum Pull #2 on | 3.00 |
| Vacuum Dump #1 On | 0.00 |
| Vacuum Dump #2 On | 0.00 |
| Vacuum Blow #1 On | 0.00 |
| Vacuum Blow #2 On | 0.00 |
| Top Main Vac #1 Off | 0.00 |
| Top Main Vac #2 Off | 53.00 |
| Bot Main Vac #1 Off | 50.00 |
| Bot Main Vac #2 Off | 7.00 |
| Top Air Eject #1 Off | 0.00 |
| Top Air Eject #2 Off | 56.50 |
| Bot Air Eject #1 Off | 54.50 |
| Bot Air Eject #2 Off | 8.00 |
| Vacuum Bleed #1 Off | 50.00 |
| Vacuum Bleed #2 Off | 0.00 |
| Vacuum Pull #1 Off | 0.00 |
| Vacuum Pull #2 Off | 8.00 |

TABLE VI-continued

Machine settings for the BROWN Four-Station Rotary Twin Sheet Thermoformer used in manufacture the pallet of Example 1.

| | |
|---|---|
| Vacuum Dump #1 Off | 0.00 |
| Vacuum Dump #2 Off | 0.00 |
| Bubble Blow #1 Off | 0.00 |
| Bubble Blow #2 Off | 0.00 |

| PRESSURE FORMING FUNCTIONS | SECONDS |
|---|---|
| Platen Locks On | 9.00 |
| Air Bags On | 10.00 |
| Inlet Needle #1 In | 16.00 |
| Mold Pressure #1 On | 11.00 |
| Outlet Needle #1 In | 0.00 |
| Inlet Needle #2 In | 9.00 |
| Mold Pressure #2 On | 11.00 |
| Outlet Needle #2 In | 0.00 |
| Platen Locks Off | 52.00 |
| Air Bags Off | 49.00 |
| Inlet Needle #1 Out | 45.00 |
| Mold Pressure #1 Off | 40.00 |
| Outlet Needle #1 Out | 0.00 |
| Inlet Needle #2 Out | 45.00 |
| Mold Pressure #2 Off | 40.00 |
| Outlet Needle #2 Out | 0.00 |

| PLATEN SEQUENCE FUNCTIONS | INCHES |
|---|---|
| Top Platen Retracted | 20.00 |
| Top Plat Ret Start 2-Speed | 6.00 |
| Top Plat Ext (Short) Stop 2-Speed | 9.50 |
| Top Plat Ext (Long) Stop 2-Speed | 6.50 |
| Top Plat Extended (Short) | 5.00 |
| Top Plat Extended (Long) | 1.50 |
| Bot Plat Extended (Short) | 9.25 |
| Bot Plat Extended (Long) | 12.25 |
| Bot Plat Ext (Short) Stop 2-Speed | 13.25 |
| Bot Plat Ext (Long) Stop 2-Speed | 17.00 |
| Bot Plat Ret Start 2-Speed | 14.00 |
| Bottom Platen Retracted | 28.00 |
| Vacuum Bleed #1 on Position | 0.00 |
| Vacuum Bleed #2 on Position | 0.00 |

| LIFT TABLE FUNCTIONS | INCHES |
|---|---|
| Lift Table Extended | 14.00 |
| Lift Table Mid Position | 20.00 |
| Lift Table Retracted | 50.00 |

The shape defining compressible core member was comprised of EPP. The core member had a substantially flat upper surface and a lower surface that included both convex and concave features. The core member included six convex conical ovals, six convex divots, and four grooves. The six convex conical ovals were in the shape of pallet support legs. The tops of the conical ovals were wider than the bottoms. The six conical voids were arranged in two sets of three voids each. A row of voids was placed between each pair of adjacent conical ovals. A pair of grooves bracketed each set of conical voids. Each groove ran parallel to the long axis of the conical oval shaped convex features. The total volume of the compressible core member was demonstratively larger before it was compressed than after it was compressed and incorporated into the pallet.

A first sheet of heated pliable TPO attached to a molding frame was positioned over the interior of a female molding tool. The core member attached by vacuum to the first platen of the Thermoformer was pushed through the first sheet. The first platen was advanced until the core member partially compressed and the first thermoplastic sheet made contact with the interior surface of the female molding tool. Residual heat in the first sheet of TPO helped to form a connection between the core member and the first sheet.

Vacuum was applied to the interior surface of the female molding tool to help hold the first sheet and the contacting core member within the interior of the female molding tool. The vacuum to the first platen was turned off and the core member was released from the first platen.

A second heated pliable sheet of TPO was attached to a molding frame and positioned between the first platen and interior of the female molding tool. The first platen was advanced until the core member compressed and the edges of the first and second sheets were compressed between the outermost flat edges of the first platen and female mold. Compressing the core member also caused the two thermoplastic sheets to contact each other between the holes in the top of conical voids of the core member.

All portions of the pallet where the first and second sheets of TPO contacted one another were heat welded. The pallet was removed from the Rotary Thermoformer. Excess thermoplastic material was removed from the edges of the pallet.

Visual and tactile examinations of the pallet showed that the core member was in substantial contact with all regions of the thermoplastic shell, except for the portions of the pallet where the two sheets are in direct contact with one another. Inspection of the regions of the two TPO sheets in direct contact with one another show that after heat welding the two sheets have bonded well to one another.

The present invention contemplates modifications as would occur to those skilled in the art. It is also contemplated that processes embodied in the present invention can be altered, rearranged, substituted, deleted, duplicated, combined, or added to other processes as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art.

All publications, patents, and patent applications cited in this specification are herein incorporated by reference, as if each individual publication, patent, or patent application was specifically and individually indicated to be incorporated by reference and set forth in its entirety herein.

Further, any theory of operation, proof, or finding stated herein is meant to further enhance understanding of the present invention and is not intended to make the scope of the present invention dependent upon such theory, proof, or finding.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected.

What is claimed is:

1. A method of forming articles including a shape defining compressible core member, and a thermoplastic external shell, said method comprising the steps of:
providing a shape defining compressible core member including a first surface and a second surface, wherein at least one surface includes a pattern of features, said core member being comprised of expanded polymer;
positioning said core member adjacent to a first heated pliable thermoplastic sheet that is without a preformed contour, to form a stack including said first sheet and said core member, wherein said first pliable thermoplastic sheet is longer and wider than said core member;
compressing said stack between a first molding tool and a second molding tool, wherein said first molding tool has a surface at least as long and as wide as said core member, and said second molding tool has a surface at least as long and as wide as said core member and a contour complimentary to the features of said at least one surface of said core member, wherein said core member is used as a plug assist to move said sheet into the contour of said second molding tool when compressing said stack;
holding said stack between said first and said second molding tools until said stack cools and bonds form between portions of said core member and said sheet in contact with one another;
removing said stack from said first and second molding tools, wherein the volume of said core member is greater before said core member is compressed between said first and said second molding tools than the volume of said core member after said stack is removed from said first and second molding tools and
wherein said core member has an uncompressed volume that is greater than a volume of a space formed by closure of said first and second molding tools.

2. The method according to claim 1, further including the steps of:
providing a perforated first surface for said interior of surface of said second molding tool; and
supplying vacuum to perforations in an interior of said first surface of said second molding tool such that said vacuum can be used to draw and hold said thermoplastic sheet into close contact with the contour of said perforated first surface of said second molding tool.

3. The method according to claim 1, wherein the distance between said first and said second molding tools is decreased by moving said first molding tool towards said second molding tool.

4. The method according to claim 1, wherein the distance between said first and said second molding tools is decreased by moving said second molding tool towards said first molding tool.

5. The method according to claim 1, wherein said expanded polymer of said core member comprises a compressible material selected from the group consisting of: Polystyrene (PS), a blend of polyphenylene ether (PPE) and polystyrene (PS) impregnated with pentane, a blend of polyphenylene ether (PPE) and polystyrene (PS) impregnated with pentane, Polyethylene (PE) and Polypropylene (PP).

6. The method according to claim 1, wherein said first thermoplastic sheet has a thickness from about 0.04 inches to about 0.08 inches.

7. The method according to claim 1, wherein said core member and said first thermoplastic sheet comprise chemically compatible materials that bond to one another when said materials are heated and held in contact with one another.

8. The method according to claim 1, including the step of, providing a second heated pliable thermoplastic sheet, wherein said second sheet is introduced into said process in an orientation substantially parallel to the orientation of said first thermoplastic sheet so as to sandwich said core member between said first sheet and said second sheet forming said stack, compressing said stack and holding said stack between said first and second molding tools until said stack cools and bonds form between portions of said core member and said second sheet in contact with one another.

9. The method according to claim 8, wherein said first and said second sheets continue to compress said core member as said stack cools and said thermoplastic sheets contract.

10. The method according to claim 8, wherein heat transferred from said first and said second heated sheets to the core member promotes bonding between the surfaces of said core member and said first and said second sheets.

11. The method according to claim 8, wherein said thermoplastic sheets comprise a thermoplastic material selected from the group consisting of:
Polypropylene/Polypropylene composite, Polycarbonate (PC), High Impact Polystyrene (HIPS), Low Density Polyethylene (LDPE), High Density Polyethylene (HDPE), Polypropylene (PP), and Polyphenylene Ether alloyed with High Impact Polystyrene.

12. The method according to claim 8, including the step of:
coating said core member with a thermo-activated adhesive before compressing said stack.

13. The method according to claim 8, wherein said core member and said first and said second thermoplastic sheets comprise chemically compatible materials that bond to one another when said materials are heated and held in contact with one another.

14. The method according to claim 8, wherein said core member comprises Expanded Polypropylene (EPP) and said first and said second thermoplastic sheets comprise thermoplastic olefin (TPO).

15. The method according to claim 14, wherein said TPO further includes talc, calcium carbonate, and pressing aids.

16. The method according to claim 14, wherein said TPO is about 0.04 to about 0.08 inches thick.

17. The method according to claim 14, wherein said first sheet of TPO is about 0.08 inches thick and said second sheet of TPO is about 0.04 inches thick.

18. The method according to claim 14, wherein said first and said second sheets are about 0.04 inches thick.

19. The method according to claim 14, wherein said EPP has a density ranging from about 1.9 to about 5.0 pounds per cubic foot (lbs./ft.$^3$).

20. The method according to claim 14, wherein said EPP has a density of about 1.9 pounds per cubic foot (lbs./ft.$^3$).

21. The method according to claim 14, wherein said core member is shaped by steam chest molding before said core member is provided to form said article.

22. The method according to claim 1, further including the steps of:
providing a first clamping frame and a second clamping frame wherein both said first and said second clamping frames are larger than said first and said second molding tools;
attaching said heated first thermoplastic sheet to said first clamping frame;
carrying out said compressing step;
attaching a heated second thermoplastic sheet to said second clamping frame;
positioning said second sheet between said first molding tool and said core member;
compressing said stack that includes said core sandwiched between said first sheet and said second sheet; and
holding said stack between said first and said second molding tools until said stack cools and bonds form between portions of said core member and said second sheet in contact with one another.

23. A method of forming articles comprising the steps of:
providing a compressible core member that includes a first surface and a second surface, wherein said second surface of said core member includes a contour;
providing a heated thermoplastic sheet adjacent said core member, said sheet being without a preformed contour;
positioning said core member and said sheet between first and second molding tools;
wherein said second molding tool has a contour that is complementary to the contour of said core member and said core member has an uncompressed volume that is greater than a volume of a space formed by closure of said first and second molding tools;
compressing said core member and said sheet together between said first and second molding tools, wherein said core member is used as a plug assist to move said sheet into the contour of said second molding tool and wherein the core member is compressed to a compressed volume that is received by the volume of the space formed by closure of said first and second molding tools;
holding said core member and said sheet between said first and said second molding tools until said core member and said sheet cool and bonds form therebetween; and
removing said sheet and said core member from said first and second molding tools, wherein the volume of said core member is greater before said core member is compressed between said first and said second molding tools than the volume of said core member after said core member and said sheet are removed from said first and second molding tools.

24. The method of claim 23 further comprising:
positioning a heated second thermoplastic sheet between said first molding tool and said core member;
compressing said core member and said first and second sheets between said first and second molding tools; and
holding said core member and said first and second sheets between said first and said second molding tools until said core member and said first and second sheets cool and bonds form therebetween.

25. The method according to claim 23, wherein said thermoplastic sheet has a thickness from about 0.04 inches to about 0.08 inches.

* * * * *